United States Patent [19]

Kahn

[11] Patent Number: 5,517,663
[45] Date of Patent: May 14, 1996

[54] ANIMATED USER INTERFACE FOR COMPUTER PROGRAM CREATION, CONTROL AND EXECUTION

[76] Inventor: Kenneth M. Kahn, 44 El Rev Rd., Portola Valley, Calif. 94028

[21] Appl. No.: 336,557

[22] Filed: Nov. 9, 1994

Related U.S. Application Data

[63] Continuation of Ser. No. 34,305, Mar. 22, 1993, abandoned.
[51] Int. Cl.$^6$ .................................................... G06F 15/62
[52] U.S. Cl. ........................ 395/800; 395/152; 395/155; 364/226.2; 364/DIG. 1
[58] Field of Search .................................. 395/800, 152, 395/155; 364/226.2, DIG. 1

[56] References Cited

U.S. PATENT DOCUMENTS

| | | | |
|---|---|---|---|
| 4,672,541 | 6/1987 | Bromley | 364/424.1 |
| 4,752,069 | 6/1988 | Okada | 273/434 |
| 4,775,934 | 10/1988 | Houri et al. | 364/300 |
| 4,827,404 | 5/1989 | Barstow et al. | 364/200 |
| 4,831,580 | 5/1989 | Yamada | 364/900 |
| 5,247,651 | 9/1993 | Clarisse | 395/500 |
| 5,297,248 | 3/1994 | Clark | 395/155 |
| 5,404,288 | 4/1988 | McDunn | 364/140 |

OTHER PUBLICATIONS

Y. Feldman, E. Shapiro, Temporal Debugging and Its Visual Animation, Internatinal Logic Programming Symposium, MIT Press (1991).
E. Shapiro, The Family of Concurrent Logic Programming Languages, ACM Computing Surveys, vol. 21, No. 3 (Sep. 1989).
K. Kahn, Objects–A Fresh Look, Proceedings of the European Conference On Object–Oriented Programming (Jul. 1989).
K. Kahn, V. Saraswat, Complete Visualizations of Concurrent Programs and Their Executions, Proceedings of the IEEE Workshop on Visual Languages (Oct. 1990).
B. Myers, Taxonomies of Visual Programming and Program Visualization, Journal of Visual: Languages and Comuting (1990).
K. Kahn, Concurrent Constraint Programs to Parse and Animate Pictures of Concurrent Constraint Programs. Proceedings of the Fifth Generation Computer Systems Conference (Jun. 1992).
J. Fenton, K. Beck, Playground: An Object Oriented Simulation System with Agent Rules for Children of All Ages, OOPSLA '89 Proceedings (Oct. 1989).
K. Kahn, Towardsd Visual Concurrent Programming, Technical Report SSL, Xerox PARC (1992).
K. Ueda, Message–Oreinted Parallel Implementation of Model Flat GHC, Proceedings of the International Conference of Fifth Generation Computer Systems, ICOT (1992).
cover, Scientific American ( Sep. 1984).
Kahn et al., "Complete Visualizations of Concurrent Programs and their Executions," Proceedings of the IEEE Workshop on Visual Languages, Oct. 1990.
Myers, "Taxonomies of Visual Programming and Program Visualization," Languages and Computing, 1990.

*Primary Examiner*—Eric Coleman
*Assistant Examiner*—John Harrity
*Attorney, Agent, or Firm*—Michael A. Glenn

[57] ABSTRACT

A computer programming system provides animated program sources that are created in an interactive visual manner. Animation is integrated with computer programming to allow a user or programmer to visualize programming flow and operation. Animated depictions are thus produced for dynamic phenomenon, such as concurrent computations. The program system supports a computation model of concurrent communicating agents. A concrete metaphor for the computation model is provided, e.g. agents are implemented as buildings; rules or methods are implemented robots or workers inside of buildings; local state is posted on bulletin boards inside of buildings; couriers carry messages between buildings; and so on.

35 Claims, 9 Drawing Sheets

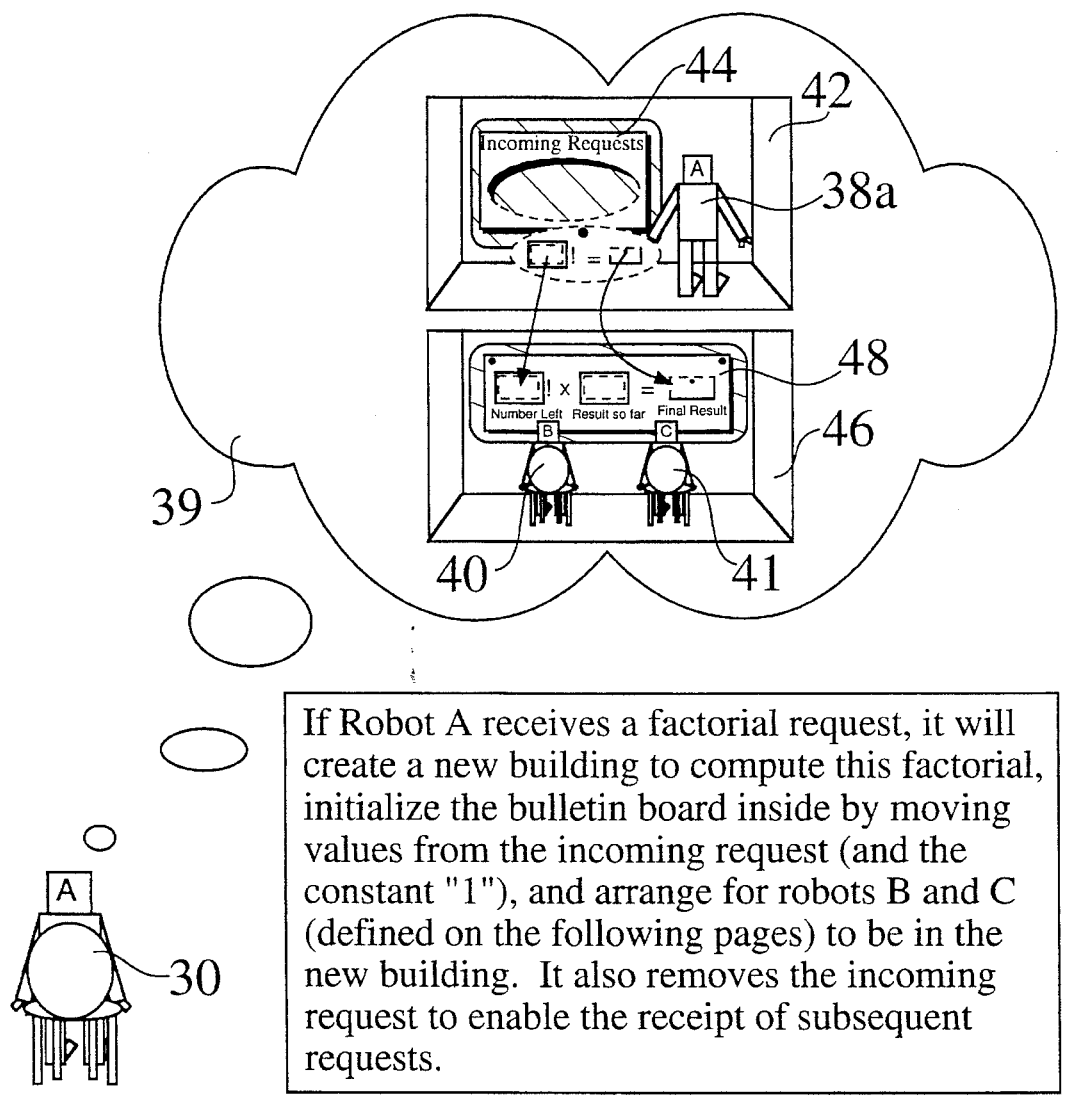

If Robot A receives a factorial request, it will create a new building to compute this factorial, initialize the bulletin board inside by moving values from the incoming request (and the constant "1"), and arrange for robots B and C (defined on the following pages) to be in the new building. It also removes the incoming request to enable the receipt of subsequent requests.

Fig. 3

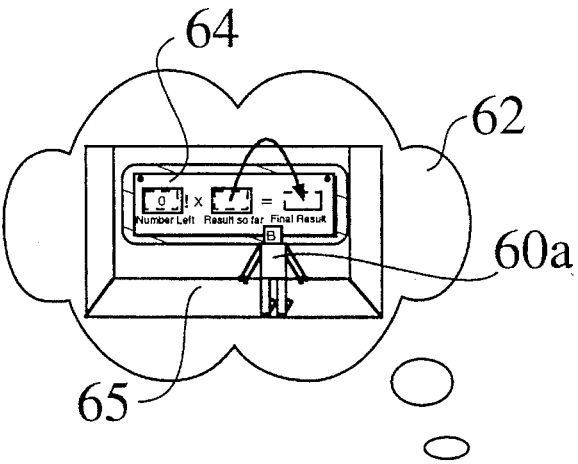
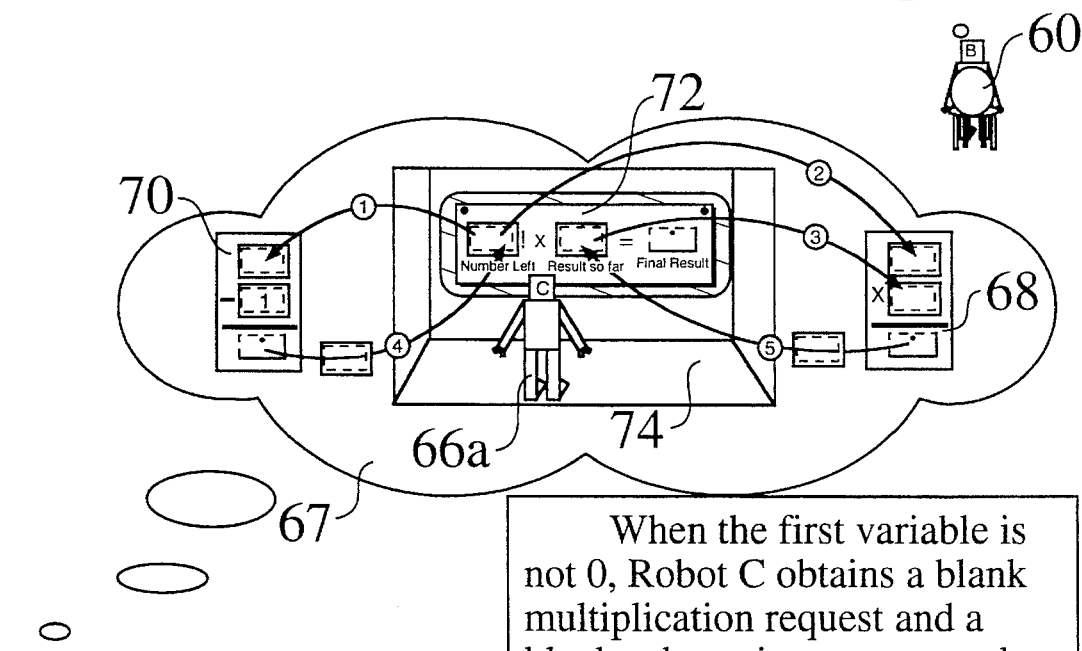
Fig. 5

ANIMATED USER INTERFACE FOR COMPUTER PROGRAM CREATION, CONTROL AND EXECUTION

This is a continuation of application Ser. No. 08/034,305 filed Mar. 22, 1993 now abandoned.

BACKGROUND OF THE INVENTION

TECHNICAL FIELD

The present invention relates to programmable machines, such as computers. More particularly, the present invention relates to interactive visual programming of the control and operation of computers.

DESCRIPTION OF THE PRIOR ART

The ability to program a computer is an important skill that currently is limited largely to professional programmers. If students, scientists, musicians, office workers, and others could program computers, it would not only be a valuable learning experience, but it would also be a valuable skill for constructing scientific simulations and visualizations, generating music, organizing the work flow processes in organizations, and so on. In addition, the very process of programming provides rich opportunities for learning fundamental problem solving and thinking skills, such as problem decomposition, representation design, and progressive refinement. Programming, however, is a difficult skill to acquire. Programming languages have their own formal syntax and complex semantics. In programming languages, there are many difficult abstract concepts and specialized formats to learn ranging from variables to subprocedures to scoping to recursion.

In the late 1960s, researchers at MIT and Bolt, Beranek, and Newman developed the Logo programming language. The essence of their approach was to take the best ideas in computer science and programming language research and "child engineer" these ideas based upon a solid understanding of child psychology and learning. These efforts were successful—Logo is used in about a third of the schools in the United States. But since Logo was designed, there has been much progress in programming languages and in user-interface design, and Logo has not kept up.

In the 1970s, Carl Hewitt and his colleagues at MIT developed the actor theory of computing. Actors are independent computational agents that communicate via message passing. Unlike conventional object-oriented programming, actors are inherently concurrent. The semantics of an actor system is invariant whether it is run as a single process on a single computer, run with each actor on a different machine communicating over a network, or variations in between. Various actor languages have been designed and implemented, though none are in widespread use. Sequential object-oriented languages which share many of the ideas behind actors have, however, become very successful (e.g. SmallTalk and C++).

In the early 1980s, researchers at the Weizmann Institute of Science in Israel, the Institute for New Generation Computer Technology (ICOT) in Tokyo, and Imperial College in London began to synthesize the best aspects of actors and of logic programming. To logic programming they introduced concurrency: the ability to express the creation, coordination, and communication of independent asynchronous computational agents or processes. To actors they brought a richer framework based upon solid mathematical and logical foundations. Operationally, the resulting systems (e.g. FCP, GHC, Parlog, see E. Shapiro, *The Family of Concurrent Logic Programming Languages*, ACM Computing Surveys (1989)) support fully encapsulated agents capable of communicating either "read" or "write" privileges in messages, in addition to ordinary data. This enables a programmer to build dynamic networks of computational agents, see K. Kahn, *Objects—A Fresh Look*, Proceedings of the Third European Conference On Object-Oriented Programming, page 207–224, Cambridge University Press (July 1989).

Formally, the resulting systems are based upon powerful and general semantic models. This semantically clean foundation enables programmers and programs to reason about programs to transform, optimize, partially evaluate (specialize), declaratively debug, and verify them. Conceptually, this concurrent logic programming framework can provide uniformity across scales, complete modularity, and compositionality. These computational agents are the basis for a uniform model from the level of interactions between large distributed systems to the small details of a particular algorithm. These agents are securely encapsulated so that from within the language there is no way to inspect, alter, or interfere with other agents (unless those agents grant permission to do so). These agents are compositional in that a collection of agents is semantically (and conceptually) indistinguishable from a single agent.

Research on these kinds of programming languages and systems has continued at the Weizmann Institute and ICOT and has spread to the Xerox Palo Alto Research Center (PARC), the Swedish Institute of Computer Science, the University of Arizona, the University of Tokyo, CalTech, Argonne National Laboratory and many other places. Additionally, a British company, Strand Software Technologies, has produced a commercial version of these languages and ported it to dozens of different types of parallel computers and workstations. Researchers at Xerox PARC have constructed higher level abstractions and languages based upon a concurrent logic programming foundation. A smaller scale project explored distributed computing, visual computing, and constraint programming from this perspective, see K. Kahn, V. Saraswat, *Complete Visualizations of Concurrent Programs and Their Executions*, Proceedings of the IEEE Visual Language Workshop (October 1990). These projects and the interactions of this group and researchers at ICOT and the Weizmann Institute are described in K. Kahn, *A Decade of Progress In Concurrent Logic Programming: A Braid of Research Threads From ICOT, Xerox PARC, and Weizmann Institute*, Communications of the ACM, 36(3) (March 1993).

Resnick at MIT has been exploring concurrent extensions to the Logo programming language and has tested his system with school children. His approach is to extend the textual Logo language with concurrency constructs. The result is more complex than sequential Logo. In fact, however, it is widely believed among programming language researchers that languages designed from scratch to support concurrency are cleaner and simpler than the result of grafting concurrency onto existing languages.

The use of pictures as computer program sources, and the animation of computer program execution has been the subject of recent research by computer scientists as one promising method of simplifying the process of generating computer programs. Such research has been widely discussed in various technical and scientific journals. See, for example B. Myers, *Taxonomies of Visual Programming and Program Visualizations*, Journal of Visual Languages and Computing 1, 97–123 (1990).

Visual programming, in which static pictures are the basis of the syntax of programming languages, is well known in the art. This is a relatively large active field with an annual international conference and the Journal of Visual Languages and Computing. The idea is to support a pictorial syntax for programming. Pictures are used rather than text to convey programs. The best commercial visual language currently is Prograph, marketed by The Gunakara San Systems, Suite 19, 1127 Barrington St., Halifax, Nova Scotia B3H 2P8, Canada.

Apple Computer (e.g. J. Fenton, K. Beck, *Playground: An Object Oriented Simulation System With Agent Rules For Children Of All Ages*, Proceedings of the Conference On Object-Oriented programming Systems, Languages, and Applications, ACM Press (1989)) is also taking an approach to visual programming, but one that is based more upon a simulation technology which relies on textual programming.

Program animation is the use of animation to depict the execution of computations. It has been pursued by a number of researchers. An approach explored at Brown University, Georgia Tech, Digital Equipment Corporation Research Laboratories and elsewhere is to annotate conventional textual programs with event descriptions. When these programs are executed a stream of events is produced as a side-effect. This stream is then mapped onto animation events and an animation of the underlying algorithm is produced. The resulting animations has been effectively used in teaching undergraduate computer science. There has been some work on animating concurrent programs (e.g. Y. Feldman, E. Shapiro, *Temporal Debugging and Its Visual Animation*, International Logic Programming Symposium, MIT Press (1991)).

Recently Pictorial Janus was built (see K. Kahn, *Towards Visual Concurrent Constraint Programming*, Technical Report SSL, Xerox PARC (1992)) which is capable of automatically producing animation of concurrent program executions based upon drawings of programs. Pictorial Janus is unique in that it provides a synthesis of visual programming and program animation. See, for example K. Kahn, *Towards Visual Concurrent Constraint Programming*, Technical Report SSL, Xerox PARC (1992); and K. Kahn, *Concurrent Constraint Programs To Parse and Animate Pictures of Concurrent Constraint Programs*, Proceeding of the International Conference on Fifth Generation Computer Systems (June 1992).

However, there has heretofore not been any prior work in which a general purpose programming language is given an animated syntax. For example, two programs, Robot Odyssey and Rocky's Boots (both are educational programs from the Learning Company of Fremont, Calif.), which allow animated representation of user specified behaviors provide an underlying computation model that is very specialized and limited (Boolean circuits in the case of Robot Odyssey). Also, see U.S. Pat. No. 4,827,404 issued to Barstow et al on 2 May 1989, in which a computer programming system simulates a program which is to be translated from a definition language to a target language and provides a visualization of such simulation in the form of an animation. In this way, a graphic editor may be employed to debug the target version of the program to assure correct operation within the program environment. However, the animation function in Barstow is limited to simulation of a translated program and is not employed during actual programming or execution of the program.

If programming could be made easy for students, then they could use computers as an enormously flexible tool for learning math, science, and engineering. Furthermore, computer programming can be more than a powerful tool; it can be a subject matter in and of itself as part of computer science and engineering. As much of the work on the Logo programming language for children has shown, the process of programming can provide many opportunities to learn basic problem solving and thinking skills. Unfortunately, despite such efforts as Basic and Logo, programming is not a skill easily acquired by most students (or teachers).

A totally new language, based upon today's best ideas in computer science and user interfaces, has the potential for much greater success than Logo. If a programming system were available that allowed programming to be both fun and easy for children, it could become an integrated part of their learning along with reading, math, and science. They could implement their own science simulations, generate computer music and art, design and build interactive games, and much more.

If a programming system of this sort were available it would be of great benefit not just to school children, but also to college students and adults. In particular, due to its interactive animated aspect, it would be an ideal tool for learning computer science concepts, such as parallel algorithms, distributed programming techniques, and concurrent programming. These are difficult topics, even for computer scientists, and yet, with the kind of computer learning environment of the present invention, they can be made significantly easier to understand.

It would be an important step forward if a programming system were available that provided a more concrete and intuitive model or metaphor to the programmer without sacrificing any of the essential generality and power of modern programming languages. It would be another important step forward if the mechanics of programming could be made to be as easy to learn and accomplish as some computer and video games. And finally, it would be a significant step forward if the underlying computational framework of such a programming system were not based on the sequential von Neumann model, but instead upon the significant advances in computer language design which have taken place over the last twenty years (discussed above). If the foregoing problems associated with computer programming are solved, programming would be much easier to learn and do, without sacrificing the expressive power of modern programming languages.

SUMMARY OF THE INVENTION

The present invention is a new and significant variant of state of the art, discussed above. Rather than using static pictures to specify programs, the present invention uses animation clips (optionally with accompanying sounds) which result in programs that are substantially easier to understand. The present invention, by providing an animation of what a program fragment does, produces a computer program that is more accessible to a user or programmer than a static diagram that contains the same information. Program animation produced in accordance with the present invention not only make the programs easier for a user or programmer to understand, but also make them more fun and entertaining to deal with. This is especially of value if this invention were applied to providing children with programming tools.

The present invention makes programming simultaneously both easier and more powerful: easier by combining in a novel way the features of animation, interactive games, and virtual reality; and more powerful by including the best and most recent results from research on computer language design. In particular, the present invention provides a computer programming system, based on parallel and distributed programming language research on concurrent logic programming and actors (concurrent objects), in which animated program sources are created in an interactive visual manner resembling video adventure games.

One important feature of the present invention is the use of animation for the source code of a general purpose programming language. Animation can communicate very effectively because the animators have complete control over what to include, exaggerate, exclude, and emphasize. By integrating animation with computer programming, a user or programmer can bring to bear the large portion of their brain which is devoted to visual perception and visual thinking while programming. Animated depictions are especially well-suited for dynamic phenomenon like concurrent computations and real time phenomena.

The preferred embodiment of the present invention is implemented as an animated programming environment based upon a video game interface that runs on a computer, such as, for example IBM-compatible personal computers. The present invention, however, is not limited to personal computers, and it also may be used in connection with video games in which programs are stored in cartridges, computers on networks, workstations, mainframes, etc.

The programming system of the present invention supports a computation model of concurrent communicating agents. A very concrete metaphor for the computation model is provided, e.g. agents are implemented as buildings; rules or methods are implemented as robots or workers inside of buildings; local state is posted on bulletin boards inside of buildings; couriers carry messages between buildings; and so on.

BRIEF DESCRIPTION OF THE DRAWINGS

FIG. 3 is a schematic representation of a second program fragment according to a preferred embodiment of the present invention;

FIG. 5 is a schematic representation of a fourth program fragment according to a preferred embodiment of the present invention;

DETAILED DESCRIPTION OF THE INVENTION

Figure 1:
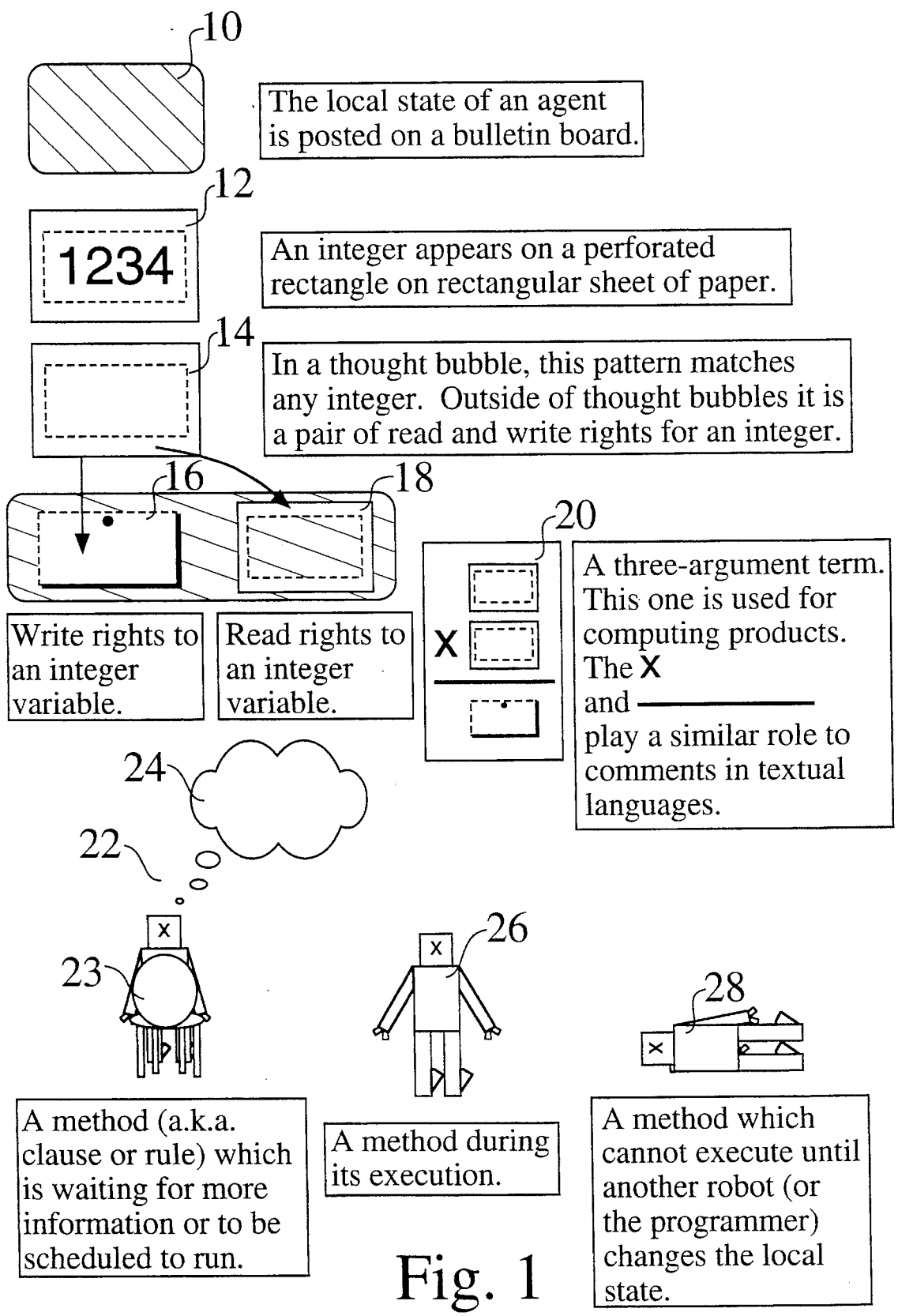
FIG. 1 is a legend depicting various animation elements according to a preferred embodiment of the present invention.

The present invention is an animated syntax and animated corresponding execution for computer programs. A very wide range of programs can be built upon the foundation underlying such animated programming system. Furthermore, the programming interface of the present invention is similar to that of interactive game technology. Thus, the present invention provides a general purpose programming language and associated programming tools that exploit to advantage various aspects of animation and game technology.

The system provided by the present invention is Turing equivalent such that any desired computer program may be constructed. The computation model of the preferred embodiment of the present invention is very similar to the model underlying the work of the Japanese Fifth Generation Project (see K. Kahn, *A Decade of Progress in Concurrent Logic Programming: A Braid of Research threads From ICOT, Xerox PARC, and Weizmann*, Communications of the ACM, 36(3) (March 1993)); of the commercially available Strand88 language, marketed by Strand Software Technologies of England; and of the Program Composition Notation (PCN) developed and maintained by California Institute of Technology and Argonne National Laboratory. In the preferred embodiment of the invention, a concurrent programming language is used that is based largely upon concurrent logic programming languages, such as Janus and FGHC, discussed above.

Significant to the present invention is the discovery that laws of a computer game universe can be constructed that are capable of expressing arbitrary computations. A large number of computer and video games provide an artificial world with their own "laws of physics". Two well-known examples are the SuperMario Brothers and the Zelda games manufactured by Nintendo of Japan. When such games are written, the designer of the games decides whether there is gravity in the game universe, what happens if two objects collide, whether movement is possible only is certain directions, etc.

The present invention recognizes that there is a class of "physical" laws for computer-sustained artificial worlds that are well suited for general-purpose computer programming. Unlike games, where the artificial world is provided for the amusement of the players, the artificial world of the present invention makes computer programming much less abstract without sacrificing any generality, thereby making programming easier to learn, easier to do, and more fun.

A preferred embodiment of the invention depicts a city in which couriers transport messages between buildings. The user may create new buildings and enter buildings. Inside the buildings there are simple programmable robots. Each robot is capable of matching a single pattern (depicted as a thought bubble) with the contents of the wall in front of it. If there is a match the robot can then perform actions such as move paper around on the wall, hand messages to couriers to deliver to other buildings, request that a builder construct a new building and so on. Each of these activities corresponds to computational events in the underlying model. The sheets of paper are data, holes in the paper correspond to logic variables or communication channels, bulletin boards on the wall hold the local state, the building is an agent, the robots are program fragments (i.e. logic programming clauses or object-oriented methods). The user or programmer may be depicted as a character in this world and is capable of doing all that robots can do, but most importantly the user or programmer can also train robots to do new actions based upon new patterns. Such training is the essence of programming. The user may interact with the system (i.e. control the programmer persona in this city, e.g. from a first person or third person perspective) via a mouse, joystick, or arrow keys on a keyboard. Sound effects may be generated to aid in understanding and to provide additional feedback.

The following is a representative set of laws for an artificial world which is capable of supporting concurrent object-oriented programming:

There are four kinds of animate beings: robots, programmers, builders, and couriers.

"Robots" live and work in "buildings".

A robot has an expectation (visible as a static "thought bubble" containing a "subpicture" of the room or building the robot is in). A subpicture displays what is visible in the room, leaving out everything that does not matter (to the behavior of this robot).

A robot sits and watches as "clippings" are posted on a "bulletin board" in the room. If the expectations of a robot are met, it stands up and if it is the first in the building to stand up it executes its "plan", otherwise it goes to sleep. If its expectations cannot be met by the posting of clippings by couriers (described below) then it goes to sleep until one of its colleagues acts or a programmer persona wakes it.

A robot manipulates entities, including those entities whose existence or state is explicitly confirmed by being in the thought bubble. The plan can include:

copying an existing miniature building (together with everything inside)

calling upon a builder to expand a miniature building to full size tearing down its own building manipulating paper by
  copying
  filling in values (only within dotted lines)
  removing a clipping (only along dotted lines, i.e. perforations)
  combining (only by filling a hole with a clipping)
  calling upon a courier to deliver a clipping A "courier" takes a clipping, finds the hole it came from, and puts it back into that hole. If the hole is occupied by the original clipping or a copy of the original clipping, then the courier waits until the clipping is removed from the hole. If the form containing the hole is copied, the courier copies the matching clipping and arranges for another courier. Thereafter, each courier puts a copy of the clipping in a corresponding hole.

Builders place and scale up buildings on empty lots. They can be asked to place them as close as possible in a particular direction, in any direction, etc.

The user of the system can view activities in this world by viewing on the computer display the output of one or more "software cameras". These can be placed in a room, on a street, or in the air, and can follow couriers, messages, builders, and programmers as they move.

Programmers can do all that robots, couriers, and builders can do, and can also:

move around outside of houses (both "on foot" and with vehicles including flying vehicles)

inspect, create, change, or destroy the expectations and plans of robots put robots to sleep or wake them up inspect, create, change, move, destroy, and decorate buildings, including "model" miniature buildings which robots can copy create, copy, destroy, and decorate "forms" (i.e. paper with perforated regions which can be clipped out, where the kind of thing that can fill that region may be indicated, for example, by the shape of the region, background images, tags, labels, etc.—e.g. number, string, picture, . . . ).

turn on and off or move the "software cameras"

There is a direct correspondence between actions in this artificial world and abstract computer operations in a high-level language (in this case concurrent logic programming languages). The buildings correspond to computational agents (also known as objects or processes). The robots inside correspond to rules of behavior (also known as clauses or methods). The thought bubble of a robot initially corresponds to the preconditions for a rule (roughly the "if" part of an if-then statement). Subsequent states of the thought bubble correspond to the body of the rule or plan. Bulletin boards hold the local state of an agent. Forms correspond to data items, data structures, and messages. Perforated regions in forms correspond to logic variables (also known as communication channels). Couriers are a concrete mechanism for communication.

Due to this correspondence, any concurrent logic program can be expressed in this artificial world and every configuration of buildings, robots, etc. in this world corresponds to a concurrent logic program.

The following definitions are provided to enable the reader to better understand the preferred embodiment of the invention:

"Rules" or "clauses" consist of a guard or ask portion and a body. A rule is personified (as a person, animal, robot—anything capable of perceiving and planning). Rules are depicted inside of "buildings" (or anything else, for example vehicles) where they share storage spaces (corresponding to the state variables of an agent).

A "guard" is depicted as the initial state of a thought bubble of these personified rules. This can be either static or animated.

The "body" of the rule is an animation of the actions of the rule, and it is depicted as a sequence of thought bubble states (excluding the initial thought bubble state). These include taking things out of mail boxes, constructing messages, creating or contacting agents, storing things, taking things out of storage, computing functions of things received or stored, copying and destroying things, and putting things in mail boxes.

The communication mechanism is visualized as a "mail" delivery system.

The details and styles of the animation provided by the present invention are greatly parameterizable. The mail delivery system, for example, can be depicted in a variety of manners which include mail carriers carrying letters and packages, "Star Trek"-like transporter rooms, and rivers with rafts of objects floating downstream, or messages can be communicated over telephones. Similarly, there are practically no restrictions on the manner in which rules and buildings are depicted or animated, so long as they are faithful to the underlying computation model.

In accordance with a preferred embodiment of the present invention, animated programs are constructed by combining pre-defined animation clips and/or by the use of video game-like control of the personified rules (e.g. as one controls the character Mario on the Nintendo Super Mario Brothers game). The quality of the images, animation, and any accompanying sound is very important in providing a compelling representation of the events underlying the animation.

FIG. 1 is a legend depicting various animation elements according to a preferred embodiment of the present invention, i.e. FIG. 1 is provided as a glossary to help the reader understand FIGS. 2–5.

FIGS. 2 to 5 depict static snapshot approximations to the animated source code for the function "factorial". The function factorial was chosen for the sample program because it is familiar to most persons. The sample program includes an agent for receiving factorial requests which spawn an agent to iteratively (or tail recursively) compute the result. Due to length considerations, variants in which the factorial is computed recursively and doubly-recursively (where each half in parallel computes the product of half the number) are not presented in the sample program.

FIGS. 2–5 do not show the adventure game-like style with which it was created. Any apparent complexity in the Figs. is due to the fact that sequences of actions are depicted by single drawings. As static figures, they do not capture the dynamics of the animation. No attempt was made in this example to show the actions of the programmer persona in constructing such a program.

In FIG. 1, the local state of an agent is posted on a bulletin board 10. An integer appears on a perforated rectangle on a rectangular sheet of paper 12. A pattern 14 matches any integer in a thought bubble; outside of thought bubbles, the pattern 14 is a pair of read rights 18 and write rights 16 for an integer. A three argument term 20 may be used for computing products. The "X" and "_____" in the term play a similar role to comments in text based computer languages. A method 22 (i.e. clause or rule) is shown as a sitting robot 23 having a thought bubble 24 waiting for more information or to be scheduled to run. A standing robot 26 represents a method during execution. A prone robot 28 represents a method which cannot execute until another robot (or the user or programmer) changes the local state, i.e. a sleeping robot.

Figure 2:
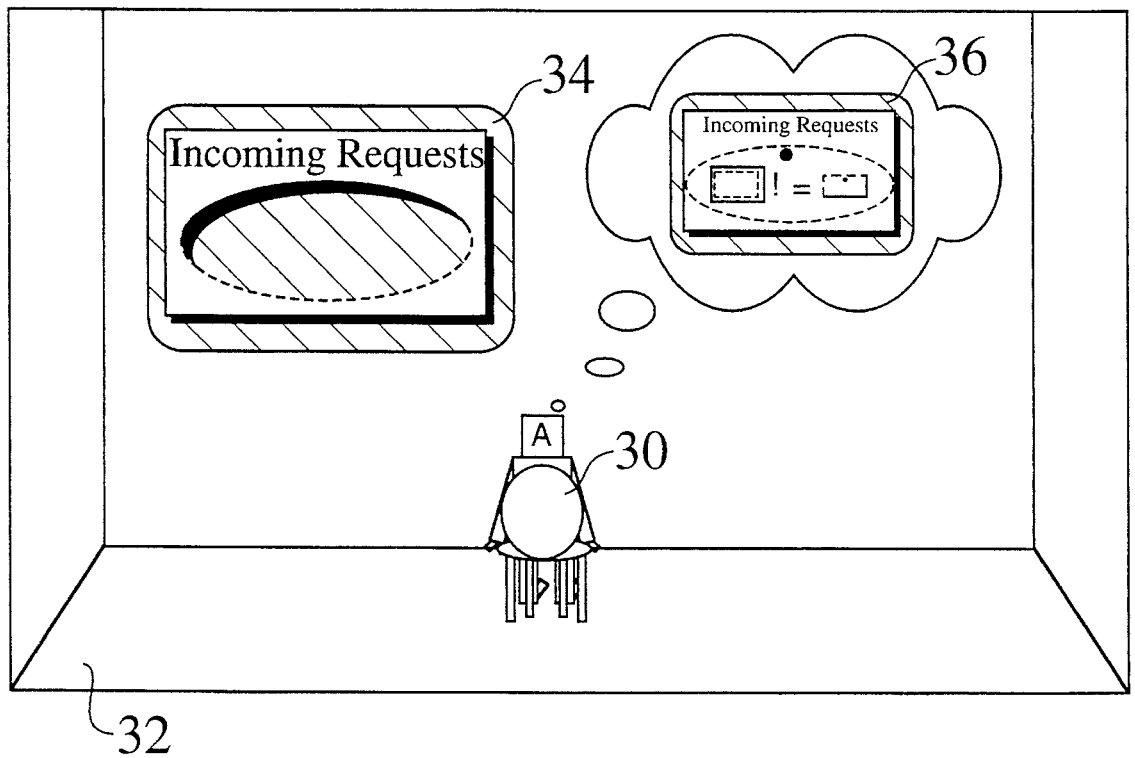
FIG. 2 is a schematic representation of a first program fragment according to a preferred embodiment of the present invention.

FIG. 2 is a schematic representation of a factorial server for a first program fragment according to a preferred embodiment of the present invention. The preconditions of a single rule are depicted in the FIG. The agent "A" 30 defined by these figures, has only one behavior, as shown in thought bubble 36. In this example, the agent, a sitting robot "A" waits in a building 32 to receive requests to be posted on a bulletin board 34 to compute the factorial of an integer, and responds by arranging for a new agent to compute the answer. Thereafter, agent "A" becomes immediately ready for the next request.

The Flat Guarded Horn Clauses ("FGHC"—see, E. Shapiro, *The Family of Concurrent Logic Programming Languages*, ACM Computing Surveys, Vol. 21, No. 3 (September 1989)) equivalent of the program fragment shown in FIG. 2 is:

```
factorial(Requests):-
    Requests = [f1(X1,X2)|More Requests],
    integer(X1),
    X2 = Steller(X3)|
    <continued in connection with FIG. 3>
```

In FIG. 3, a second program fragment which, together with FIG. 2, implements a factorial server, a sitting robot "A" 30 has a behavior, shown in thought bubble 39. In the thought bubble, if standing robot "A" 38a in building 42 receives a factorial request on bulletin board 44, it creates a new building 46 to compute the factorial and it initializes the bulletin board 48 inside the building 46 by moving values from the incoming request (and the constant "1"). Robot "A" 38a also arranges for sitting robots "B" 40 and "C" 41 to be in the new building and removes the incoming request to enable the receipt of subsequent requests.

The FGHC equivalent of this program fragment is:

```
<continued from discussion of FIG. 2>
    fact1(X1,X2),
    factorial(MoreRequests).
```

Figure 4:
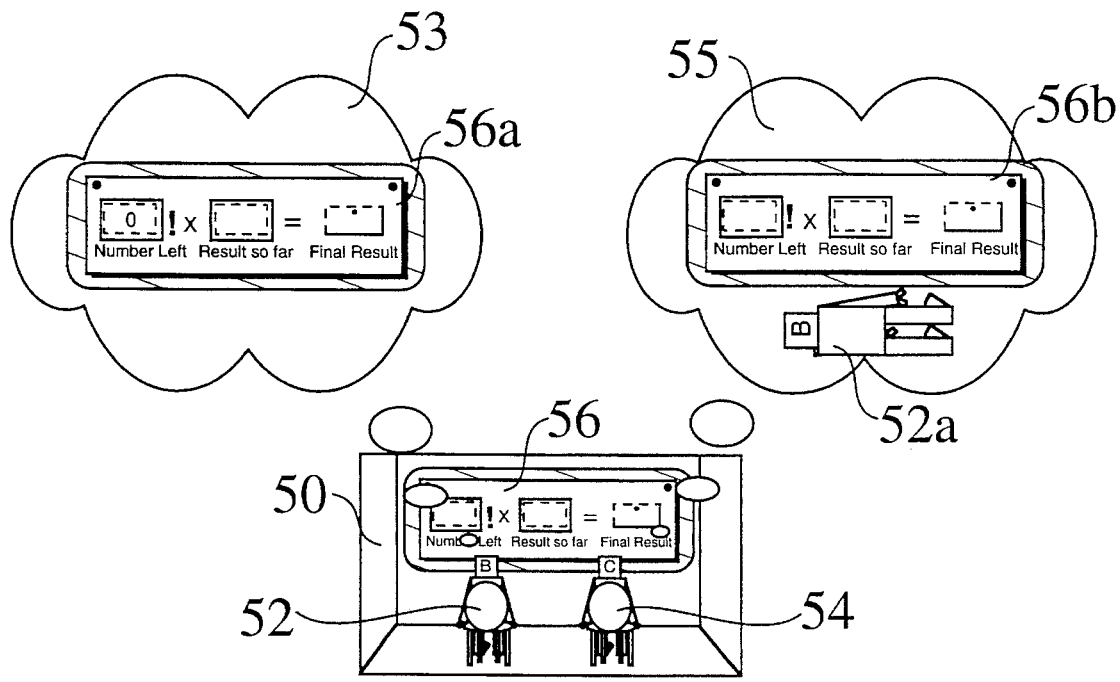
FIG. 4 is a schematic representation of a third program fragment according to a preferred embodiment of the present invention.

The agent depicted in FIG. 4, which is a first program fragment for an iterative factorial, has two potential behaviors. The sitting robot labeled "B" 52 in building 50 is waiting until a zero is placed in the leftmost position of bulletin board 56 (as shown on bulletin board 56a in thought bubble 53), while sitting robot "C" 54 is waiting for robot "B" to go to sleep because the first variable is not zero (i.e. in the robot "C" thought bubble 55, when the leftmost position of bulletin board 56b is not zero, robot "B" 52a goes to sleep, indicating the method cannot execute until another robot, such as robot "C", or the programmer persona changes the local state).

The FGHC equivalent program fragment is represented as follows:

```
fact1(X1,X2,X3) :-
    X1 = 0,
    integer(X2)
    X3 = Steller(X4)|
    <continued in connection with FIG. 5>
fact1(X1,X2,X3)
    X1 =[!]m=0,
    integer(X1),
    integer(X2),
    X3 = Steller(X4)|
    <continued in connection with FIG. 5>
```

FIG. 5 is a schematic representation of a second program fragment for an iterative factorial according to a preferred embodiment of the present invention. When the first variable received by sitting robot "B" 60 (as shown in thought bubble 62 in room 65 on bulletin board 64) is a zero, standing robot "B" 60a copies the value of the second variable from the middle position of the bulletin board 64 onto the third variable in the rightmost position of the bulletin board. Robot "B" 60a then removes a paper with the rightmost value and gives it to a courier for delivery to a corresponding "asker". The robot then arranges for the destruction of its building 65 since it has completed its function.

The FGHC equivalent of this program fragment is:

```
<continued from discussion of FIG. 4>
    X4 = X2.
```

In FIG. 5, the sitting robot labeled "C" 66 is waiting for conditions to be such that robot "B" cannot act (i.e. the leftmost value is a number other than zero). As depicted in thought bubble 67, standing robot "C" 66a in building 74 obtains (e.g. by copying from the originals) two forms: one form 68 for performing multiplication and the other form 70 for performing subtraction. The subtraction form is filled in so that when it is delivered and acted upon the leftmost value on bulletin board 72 is replaced with a number one less than what was there previously. The multiplication form is filled out so that the middle value on bulletin board 72 is replaced by the product of what was there previously and what was the leftmost value. When the subtraction and multiplication have been performed, if the leftmost value has become zero, robot "B" takes over, otherwise robot "C" repeats its actions.

The FGHC equivalent of this program fragment is:

```
<continued from discussion of FIG. 4>
    MathRequests=
    [subtract(X1,1,$teller(NX1))|M1],
    M1=[multiply(X1,X2,$teller(NX2))|M2],
    fact1(NX1,NX2,X3).
```

Figure 6:
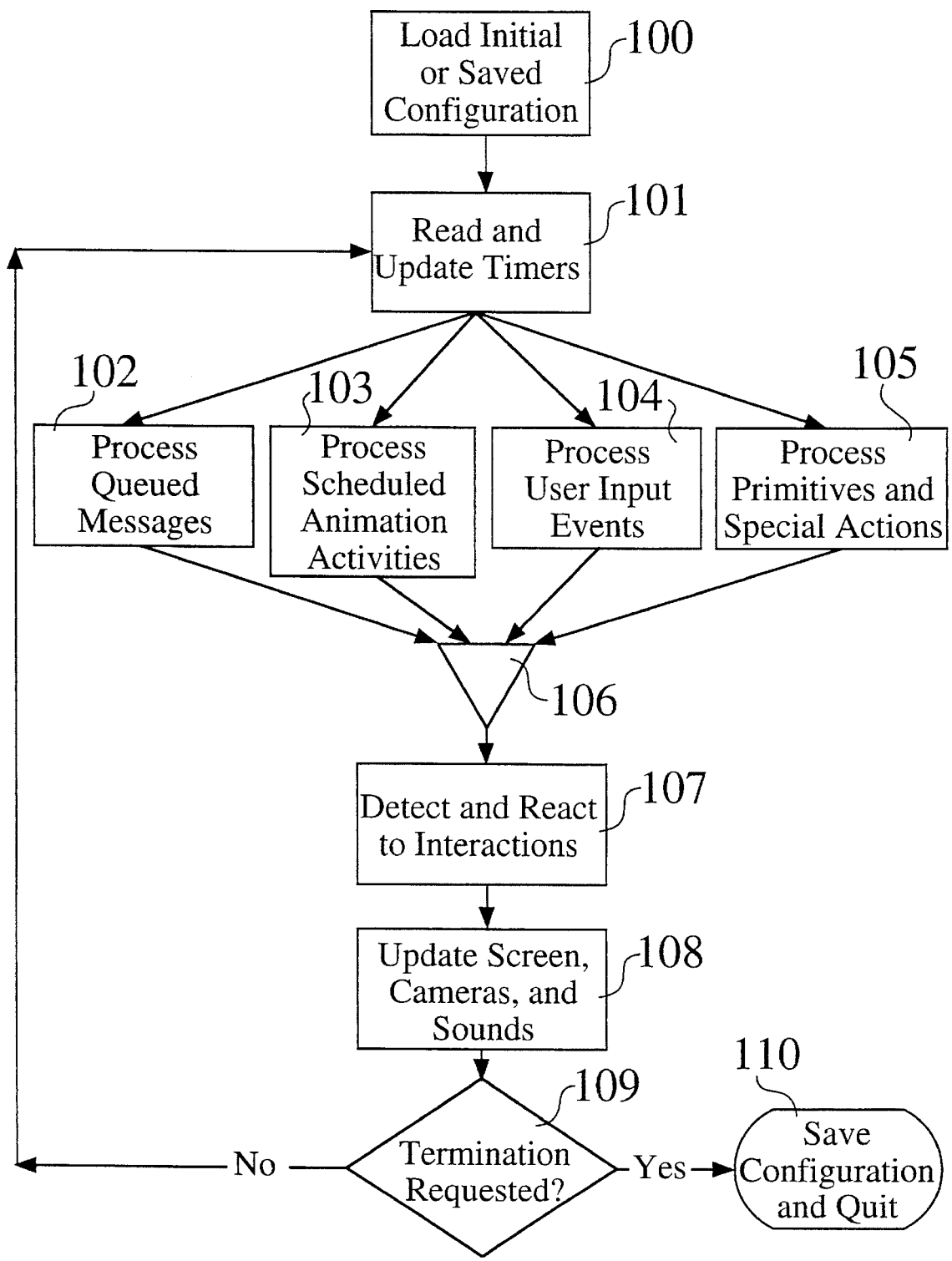
FIG. 6 is a flow diagram of top level processes according to a preferred embodiment of the present invention.

FIG. 6 is a flow diagram of top level processes according to a preferred embodiment of the present invention. Operation of the system is as follows:

A. When the system is started (100), either a file describing a saved configuration is processed or the system starts in the initial configuration.

B. The system clock of the computer is read and the time recorded (101). If too much time has passed since the last reading, parameters may be adjusted to reduce the time to execute processes (102) through (108), by sacrificing the quality of the images, animation, or sounds. If very little time has passed then parameters may be set to improve the quality of the images, animation and sounds.

C. Messages which are pending delivery are processed (102). Details are presented in connection with FIG. 7.

D. Animation events scheduled for this time are processed (103). Details are presented in connection with FIG. 8.

E. The computer's input devices such as a mouse, keyboard, or joystick are read (104) and the system reacts to any input events. Details are presented in connection with FIG. 9.

F. Program fragments to use external devices such as the network, modems, file systems, or printers are executed (105). Schedulers of user events are updated. Also the services of externally defined libraries are made available by this process.

G. Processes (102) through (105) can happen in any order or simultaneously. Only when all of these processes have completed (106) for this cycle can operation of the system proceed (107).

H. The system detects interactions between components (107). The most common interaction is when one visual element crosses (collides with) another. Program fragments associated with one or both of these elements may be executed as a result. For example, if the programmer persona attempts to move where a door to a building is, then this is detected and program fragments are executed to open the door and adjust the position of the programmer persona so it must wait until the door is open before proceeding.

I. The internal state of the system has now progressed one cycle and is in a consistent state (108). The computer display and sound generators are updated to reflect the new state.

J. If termination has been requested (109)—typically by the user—the system optionally saves the current state and quits (110). If not the system repeats processes B through J.

Figure 7:
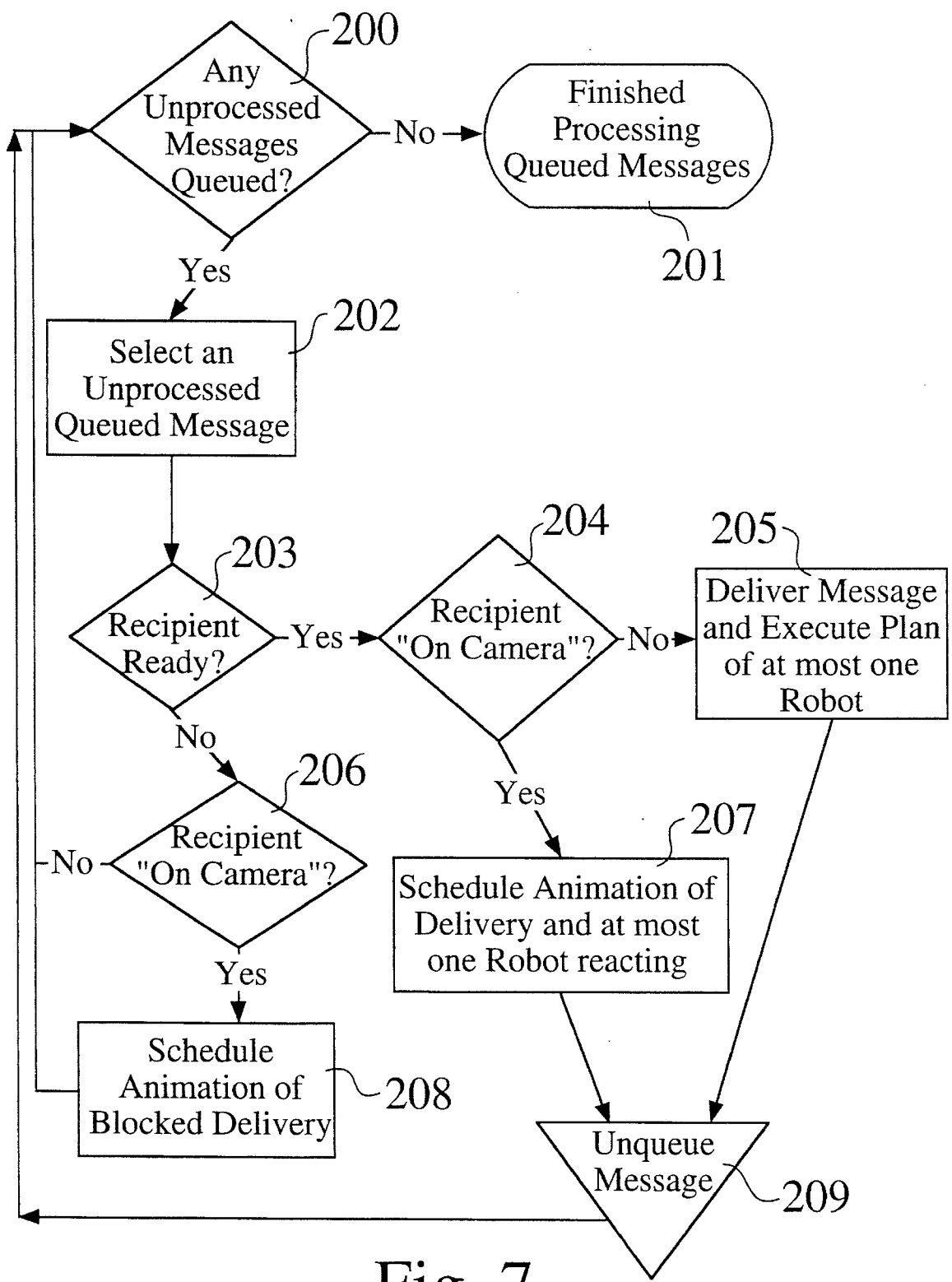
FIG. 7 is a flow diagram of a queued message process shown on FIG. 6, according to a preferred embodiment of the present invention.

FIG. 7 is a flow diagram of a queued messages process shown on FIG. 6, according to a preferred embodiment of the present invention.

In the literature on the implementation of actor and concurrent logic programming systems, two approaches are described: one approach is to maintain a queue of active or ready agents (as described in U.S. Pat. No. 4,775,934, issued to Houri et al on 4 Oct. 1988), the other approach maintains a queue of active or ready communications (for example, described in K. Ueda, M. Morita, *Message-Oriented Parallel Implementation of Model Flat GHC*, Proceedings of the International Conference on Fifth Generation Computer Systems 1992, ICOT (1992)). The preferred embodiment of the present invention maintains a queue of active or ready communications. Both approaches are functionally equivalent, but they differ in processor and memory use, depending upon usage patterns.

1. If all pending message communications for this cycle are performed that could have been performed (200), then this process is finished until the next cycle (201).
2. Any pending message communication not already considered during this cycle can be chosen (202). It is then marked as processed. (Either by updating a variable associated with this communication or by removing the record associated with this communication from the pool of pending communications.)
3. Next it is determined whether the recipient is ready to receive a communication (203).
4. It is determined whether the recipient is within the viewing region of any of the software equivalents of cameras (204,206) which display a portion of the state of a computation.
5. If it is not, then the message is delivered (205). The local state of the recipient is updated. If the preconditions of any of the rules (visualized, for example, as thought bubbles of robots) are met then one of those rules is chosen to execute (it is unimportant which one). The "body" of that rule is executed by the system which may, depending upon how the user defined it, generate new pending communications (either for this cycle or the next), may update the local state of the agent, may cause the creation of new agents, and may cause the termination of this agent.
6. An animation which both updates and depicts the updating of the local state of the recipient is scheduled (207). If the preconditions of any of the rules are met then one of those rules is chosen to execute (here, too, it is unimportant which one). Animation which both perform and depict the performance of the actions associated with the "body" of that rule are scheduled.
7. An animation which depicts the blocked delivery of the message is scheduled (208). For example, if the system displays couriers which deliver messages, then a courier which cannot presently deliver its message can be displayed as queuing up with other couriers waiting for the delivery to become unblocked.
8. After either step (205 or 207) completes the selected message is removed from the pool of messages to deliver (209). Thereafter, the cycle is repeated.

Figure 8:
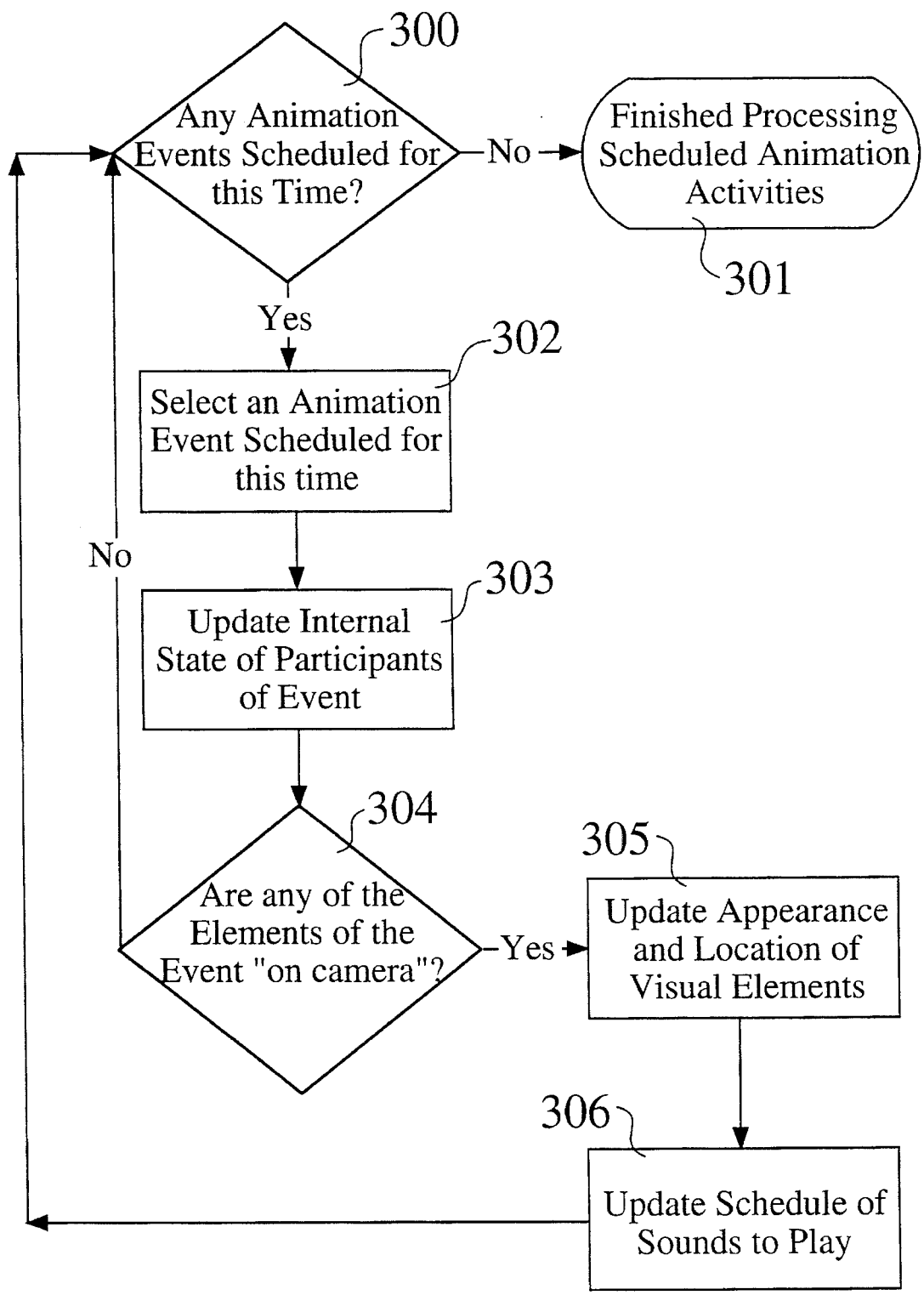
FIG. 8 is a flow diagram of a scheduled animation activities process shown on FIG. 6, according to a preferred embodiment of the present invention.

FIG. 8 is a flow diagram of a scheduled animation activities process shown on FIG. 6, according to a preferred embodiment of the present invention.

1. It is determined whether there are any animation events scheduled for this time (300).
2. If not then this process is finished for this system cycle (301).
3. Otherwise any event is selected from the pool of scheduled events (302).
4. In accord with the type of the event, the internal state of the participants of the event are updated as a function of how much time has passed since the last update (303).
5. It is determined whether any of the participants of the event are displayed by the software cameras observing this portion of the computation (304).

6. If so, the display state of the visible participants is updated. This includes the position, orientation, and appearance of the participants (305). For example, if the event is a message delivery and the system displays couriers delivering messages, then the position and appearance of the courier carrying the message is updated. If the action is completed, the internal state of the system is updated accordingly, and the event is removed from the schedule.
7. Animation events describe both display and audio actions to be performed (306). Here the appropriate audio actions are taken. The entire sequence is repeated starting with step (300).

Figure 9:
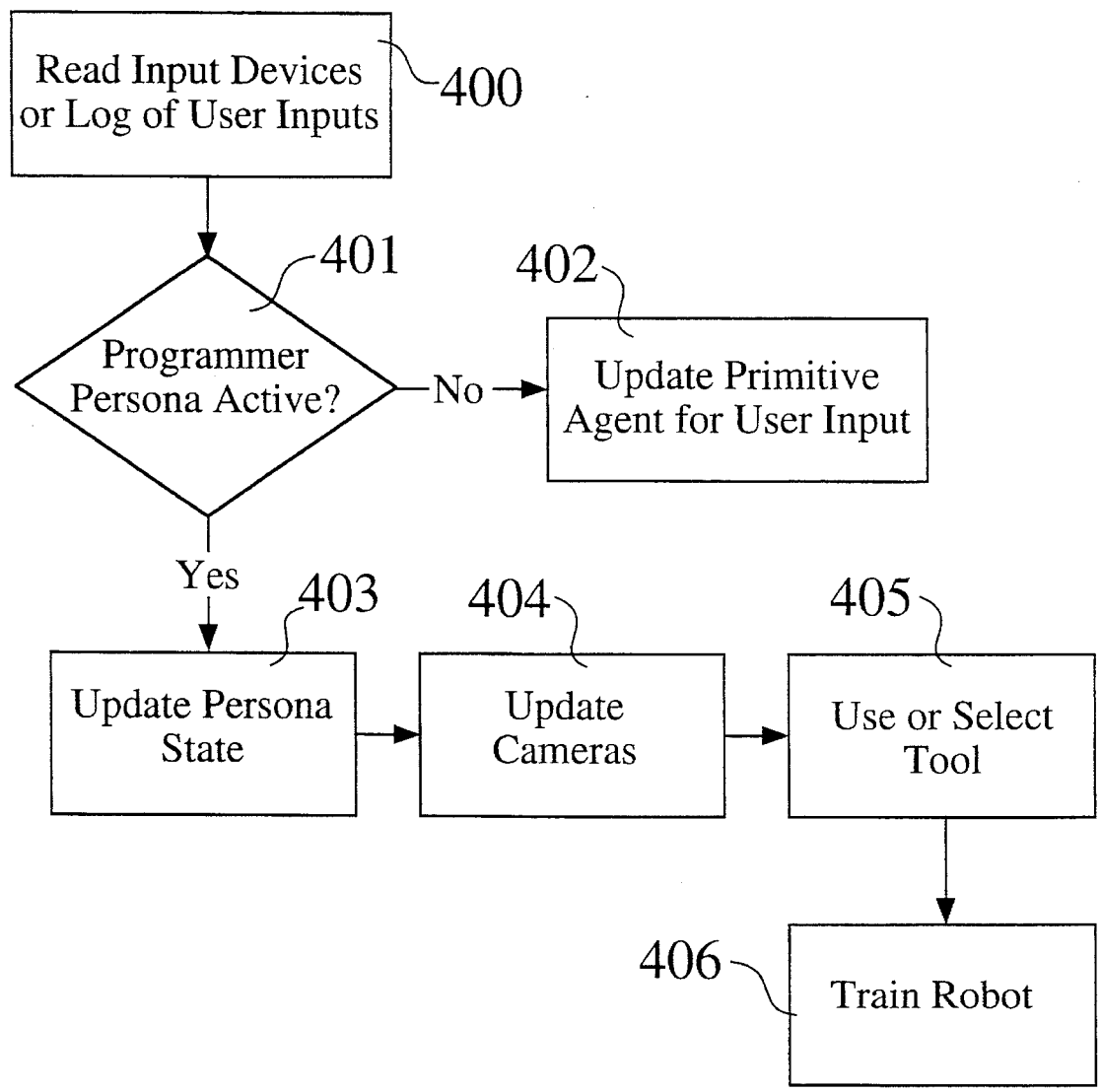
FIG. 9 is a flow diagram of a user input events process shown on FIG. 6, according to a preferred embodiment of the present invention.

FIG. 9 is a flow diagram of a user input events process shown on FIG. 6, according to a preferred embodiment of the present invention.

1. The actions of user input devices (e.g. keyboards, joysticks, and mice) since the last cycle are determined (400). Alternatively if the system is replaying a log of user input events, the actions from the appropriate portion of the log are determined.
2. It is determined whether the programmer persona is active (401). Typically it is inactive when running an application unless the user is trying to understand, modify, or extend the workings of the application.
3. If not, then the input actions are made available to the running application (402).
4. If so, then the state of the programmer persona is updated (403, 404, 405, 406). This may include:

updating the position, orientation or appearance of the persona moving or turning on or off software cameras selecting a tool using a tool defining the actions of a rule (for example, by training a robot)

defining the preconditions of a rule (for example, by editing the thought bubble of a robot)

editing, copying or creating a data structure or message (depicted, for example, as forms on paper)

arranging for the delivery of a message (for example, calling upon a courier and giving it the message)

creating and initializing a new agent deactivating a robot activating an inactive robot Tools that the programmer may select or use include those:

to place text in data structures (e.g. a pen for writing)

to copy data structures to remove portions of a data structure (e.g. removing a perforated section of a form)

to communicate data (e.g. by calling a courier and giving it a form)

to arrange for the construction of a new building (e.g. by calling upon builders and giving them a plan or miniature of the desired building)

to build new rules (e.g. by obtaining a new robot and defining its thought bubble and by training it to perform the appropriate actions)

The following extensions and alternative embodiments of the present invention may be provided as appropriate and desired:

Security and multiple programmers.

Buildings have doors with locks but a programmer has a master key for his or her "domain". (Couriers don't need keys.)

Meta-programming.

A robot can get other robots to help and can copy and transfer expectations and plans between robots. A robot can train another robot. In general, for meta-programming robots can do all that programmers can.

Lexical scoping.

A room in a building can contain a miniature city. The city is a real functioning city with robots, couriers, etc. Clippings can be delivered to and from miniature cities. A building in a miniature city may have a building with an even more miniature city inside. A robot in a miniature city can see and copy papers in the containing building (any number of levels up). A robot cannot see or change things inside a building in a miniature city. As with lexical scoping in textual programming languages this can provide greater modularity and more concise expression.

Graphical programming.

Any subset of the following may be used:

1. Direct representations. The graphical display of an application is a software camera on a bulletin board. User input is done by programmer actions, e.g., Tic Tac Toe where the X's and O's are values in a 3 by 3 grid of local variables.
   2. Introduces vehicles which are like buildings except that they have a "dashboard" which is like a bulletin board but displays and controls the position, orientation, and appearance of the vehicle. The appearance of a vehicle (its "disguise") is as seen from a standard camera position (e.g. above). The primitives for describing the appearance are general enough that the appearance of a single vehicle can be an entire scene of an application. The programmer can enter a vehicle from a door on the side (or underneath). User input can be either via programmer manipulations or reacting to messages from input devices (e.g. the mouse).
   3. The appearance of buildings, couriers, robots, programmers, and builders is under user control. There is a standard protocol for updating these appearances and dealing with interactions.
   4. A window or screen is just a device one communicates with. Ditto for the mouse/keyboard. They are buildings where messages come in and out but cannot be entered by the programmer or software cameras.
   5. Like 4. above, except a special custom visualization of the activities inside is available. For example, cameras can record pictures on the wall of a room. The output of these cameras can be mixed to produce interactive 2½ dimensional animation. Robots in these buildings can paint new pictures, move, scale, rotate and mix pictures. Microphones work in a similar way and can produce a synchronized soundtrack.

Inheritance and Delegation.

The concepts of inheritance and delegation, for example as known in C++, SmallTalk, and the Common Lisp Object System, are readily expressed by the present invention. Two examples follow:

1. If the original from which agents were copied is modified, those changes propagate to all copies.
   2. Inside a building there may be multiple bulletin boards and sets of robots. All but one of each set of bulletin boards and robots correspond, respectively, to the state variables and behaviors inherited from the super-class or super-classes (i.e. the base class). The sets of robots are ordered such that the first set of robots associated with the sub-class (i.e. derived class) is given an opportunity to act. If none of the first set of robots can act, then the set of robots associated with the immediate super-class (or classes) are given a chance to act, and so on.

Many other alternative embodiments of the invention are contemplated having essentially the same "physical" laws. The essence of the laws involve groups of entities with conditional behaviors which share some state, communicate, and spawn new groups of entities. For example, an alternative embodiment of the invention provides a magical theme where instead of programmers and robots there are sorcerers and apprentices. Most actions are performed with a magical wand. Another theme is a futuristic science fiction theme were communication is between electronic bulletin boards (no couriers) and transportation includes "teleporting" directly between two distant locations. A theme based upon Alice in Wonderland is feasible. Many other themes could be adapted.

Additionally, alternative metaphors are possible for each computational construct. Communication, for example, need not be done by couriers, but could mimic the postal system with letters inside envelopes, packages, forwarding addresses, etc. Or cellular phones could be used for communication, messages could be faxed between buildings, or items may be placed on rafts so they float down a river. Data structures need not resemble forms, but could be items in containers, or loose-leaf notebooks. Local state need not be kept on bulletin boards, but could be spread between different rooms or boxes or shelves. Rather than relying upon position, data could be identified by color, shape, texture or labels. Rules need not be robots. Any animate object which can reasonably be depicted as thinking and planning would work. The guard portion of thought bubbles need not be static nor subpictures of the local surroundings, but could be dynamic (involve actions), could reference distant objects, and may express conventions for negation, disjunction and primitive tests. For example, negation may be indicated by a graphical convention, such as a circle with a diagonal slash through it, which is placed on the item to be negated. Agents need not be depicted as buildings or vehicles but could themselves be animate objects where the rules are like homunculi inside the mind of the agent, or agents could be trees and squirrels could be the rules.

The physical laws of the artificial world need to support some general purpose programming language, but it need not be concurrent or based upon agents (or objects). A sequential object-oriented computation model could follow the same metaphor, but only one action happens at a time in the entire world. A production system or Linda-like computational model (see D. Gelernter, *Generative Communication in Linda*, ACM Transactions on Programming Languages and Systems, vol 7, no. 1 (January 1985)) could have many of the laws presented here, but would differ in that all of the robots would be gathered around one big bulletin board. The robots' thought bubbles would be interpreted as representing a subset of the things posted on the board (typically permuted in some fashion). A procedural computation model can be supported in the same fashion as a sequential object-oriented one except only one building is allowed.

A networked version of the present invention is useful for learning about and building collaborative software and distributed applications. The animated programming system of the present invention is also useful as a front end or a teaching tool for concurrent languages with a similar computation model which are used for scientific computing on massively parallel supercomputers.

Programs may be developed as animation and then the ordinary textual code or object code equivalent is automatically produced. The present invention also has application with regard to virtual reality. The current design of a 2½ dimensional non-immersive computational world generalizes quite well for a three dimensional immersive environment. One then programs virtual reality from within virtual reality.

It is anticipated that the present invention will find ready application at least in the following areas:

Programming.

Enabling children, non-programmers, dyslexics, and programmers who think visually to program computers, including real time, distributed, and parallel computing.

Modeling/Simulation Tool.

Especially well-suited for interacting, communication, or other complex processes, e.g. workflow, top-level software architecture, cooperative problem solving, traffic, power grid management, etc.

Education.

As an environment for learning problem solving, for interactive animation of complex processes (e.g. those listed above), and for teaching about parallel and distributed algorithms and systems.

Shell Scripts.

As an environment for designing and running shell scripts, such as complex sequenced database queries (for example, the capsule capability offered by Metaphor Computer Systems).

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. An apparatus for independently and/or simultaneously creating, modifying, controlling, and executing a computer program, comprising:

at least one programmer persona in an interactive animated computer sustained artificial world in which said computer program creation, modification, control, and execution proceeds in real time in accordance with the actions of said programmer persona, said computer sustained artificial world comprising:

at least one animated agent;

said agent including at least one animated personified rule, each rule having a guard portion for visually representing preconditions of said personified rule, and a body portion for visually representing actions of said personified rule;

each agent including a visual representation of local state; and animated messages for exchanging information between said agents; and display means for visually representing data structures which are representations of local state and are components of rules, and which are or which may include at least one of data items, other data structures, logic variables, and messages.

2. The invention of claim 1, wherein said complex process is a computer program.

3. The invention of claim 2, wherein said computer program is a concurrent program.

4. The invention of claim 2, wherein said computer program is an object oriented program.

5. The invention of claim 2, wherein said computer program is a concurrent object oriented program.

6. The invention of claim 2, wherein said computer program is a source code of a general purpose computer programming language.

7. The invention of claim 1, further comprising:

audio means for audibly representing at least portions of said computer sustained artificial world.

8. A process for independently and/or simultaneously creating, modifying, controlling, and executing a computer program, said process comprising the steps of:

providing at least one programmer persona in an interactive animated, computer sustained artificial world in which said computer program creation, modification, control, and execution proceeds in real time in accordance with the actions of said programmer persona; and, in said computer sustained artificial world:

displaying at least one animated computational agent which corresponds to underlying processes in said complex process;

displaying preconditions of a personified rule;

displaying actions of said personified rule;

displaying local state;

displaying data structures which are visual representations of local state and are components of rules, and which are or which may include at least one of data items, other data structures, logic variables, and messages; and displaying information exchange between said agents.

9. The invention of claim 8, wherein said complex process is a computer program.

10. The invention of claim 9, wherein said computer program is a concurrent program.

11. The invention of claim 9, wherein said computer program is an object oriented program.

12. The invention of claim 9, wherein said computer program is a source code of a general purpose computer programming language.

13. The invention of claim 8, further comprising the step of:

audibly representing at least portions of said computer sustained artificial world.

14. A user interface computer program, for independently and/or simultaneously creating, modifying, controlling, and executing an animated visual representation of an underlying computer program, said underlying computer program being described in a high-level computer language, said interface comprising:

at least one programmer persona in an interactive animated computer sustained artificial world in which said computer program creation, modification, control, and execution proceeds in real time in accordance with the actions of said programmer persona, said computer sustained artificial world comprising:

at least one animated computational agent;

said agent including at least one animated personified rule, each rule having a guard portion for visually representing preconditions of said personified rule, and a body portion for visually representing actions of said personified rule;

each agent including a visual representation of local state; and animated messages for exchanging information between said agents; and display means for visually representing data structures which are representations of local state and are components of rules and which are or which may include at least one of data items, other data structures, logic variables, and messages.

15. The invention of claim 14, said visual representation of said underlying computer operation further comprising:

a theme that defines a programming environment.

16. The invention of claim 14, said theme further comprising:

a metaphor that defines user perceptible programming environment elements.

17. The invention of claim 16, said metaphor comprising:

at least one building corresponding to each agent;

at least one robot within said building, said robot corresponding to each rule, said robot including a thought bubble, said thought bubble representing a rule precondition and rule actions; said robot being animated to represent said rule body portion;

at least one bulletin board within said building, said bulletin board representing agent local state;

at least one form visually representing data structures which are representations of local state and are components of rules, and which are or which may include at least one of data items, other data structures, logic variables, and messages; and at least one courier, representing communications between agents, for exchanging messages between buildings.

18. The invention of claim 17, said metaphor further comprising:

at least one camera for providing a programmer with at least one selected view for observing program execution.

19. The invention of claim 17, said metaphor further comprising:

a programmer persona present in said programming environment to effect programming in the underlying language.

20. The invention of claim 19, wherein said programmer persona is a first person representation.

21. The invention of claim 19, wherein said programmer persona is a third person representation.

22. The invention of claim 17, further comprising:

locks on said buildings to limit access within said buildings and thereby limit access to the underlying source code and local state.

23. The invention of claim 17, further comprising:

robots for training and supervising other robots to effect meta-programming.

24. The invention of claim 17, further comprising:

at least one room within a building, said room containing a city corresponding to an underlying computer program component to provide lexical scoping.

25. The invention of claim 16, said metaphor further comprising:

means for effecting inheritance and/or delegation, such that if an original agent from which other agents were copied is modified, those changes propagate to all copies of said original agent.

26. The invention of claim 16, said metaphor further comprising:

multiple bulletin boards and sets of robots inside a building, all but one of each set of robots and bulletin boards corresponding, respectively, to state variables and behaviors inherited from a super-class, said sets of robots being ordered such that a first set of robots is associated with a sub-class of said super-class and is given an opportunity to act, and such that if none of said first set of robots can act, then sets of robots associated with an immediate super-class and more distant super-classes are, in order, given a chance to act.

27. The invention of claim 14, wherein said animated visual representation is implemented in a virtual reality environment.

28. The invention of claim 14, further comprising:

means for effecting format conversion of said representation from said visual format to a machine readable format.

29. A method for independently and/or simultaneously creating, modifying, controlling, and executing an animated visual representation of an underlying computer program, said underlying computer program being described in a high-level computer language, said method comprising the steps of:

providing at least one programmer persona in an interactive animated, computer sustained artificial world in which said computer program creation, modification, control, and execution proceeds in real time in accordance with the actions of said programmer persona; and, in said computer sustained artificial world:

providing at least one animated computational agent;

said agent including at least one animated personified rule, each rule having a guard portion for visually representing preconditions of said personified rule, and a body portion for visually representing actions of said personified rule;

each agent including a visual representation of local state; and exchanging information between said agents with animated messages; and displaying data structures which are visual representations of local state and are components of rules, and which are or which may include at least one of data items, other data structures, logic variables, and messages.

30. The invention of claim 29, further comprising the step of:

providing a selected theme that defines a representation environment; and providing a selected metaphor that defines user perceptible elements in said representation environment.

31. The invention of claim 30, wherein said metaphor comprises:

at least one building corresponding to each agent;

at least one robot within said building, said robot corresponding to each rule, said robot including a thought bubble, said thought bubble representing said rule precondition and rule actions;

said robot being animated to represent said rule body portion;

at least one bulletin board within said building, said bulletin board representing agent local state;

at least one form visually representing data structures which are representations of local state and are components of rules, and which are or which may include at least one of data items, other data structures, logic variables, and messages; and at least one courier, representing communications between agents, for exchanging messages between buildings.

32. The invention of claim 31, further comprising the step of:

providing a programmer with at least one camera having at least one selected view, wherein said programmer may observe program execution.

33. The invention of claim 31, further comprising the step of:

manipulating, with a robot, entities, including those entities whose existence or state is explicitly confirmed by being in the thought bubble, including any of the steps of:

copying an existing building, together with everything inside the building;

calling upon a builder to expand a building;

tearing down its own building; and manipulating a paper by copying, filling in a value within dotted lines, removing a clipping along dotted lines or perforations, combining by filling hole with a clipping, or calling upon a courier to deliver a clipping.

34. The invention of claim 31, further comprising the step of:

manipulating, with a programmer persona, entities, including those entities whose existence or state is explicitly confirmed by being in the thought bubble, including any of the steps of:

copying an existing building, together with everything inside the building;

calling upon a builder to expand a building;

tearing down its own building;

manipulating a paper by copying, filling in a value within dotted lines, removing a clipping along dotted lines or perforations, combining by filling a hole with a clipping, or calling upon a courier to deliver a clipping;

moving around outside of houses, either on foot or with vehicles;

inspecting, creating, changing, or destroying expectations and plans of robots;

putting robots to sleep and waking robots up;

inspecting, creating, changing, moving, destroying, and decorating buildings, including model miniature buildings which robots can copy;

creating, copying, destroying, and decorating forms with perforated regions which can be clipped out, where the kind of thing that can fill that region may be indicated by region shape, background images, tags, labels, etc.; and turning on and off or moving cameras.

35. The invention of claim 30, said metaphor representing said underlying computer program, said metaphor comprising:

at least one animated computational agent;

said agent including at least one animated personified rule, each rule having a guard portion for visually representing preconditions of said personified rule, and a body portion for visually representing actions of said personified rule;

each agent including a visual representation of local state; and said method further comprising the steps of exchanging information between said agents with animated messages; and displaying data structures which are representations of local state and are components of rules, and which are or which may include at least one of data items, other data structures, logic variables, and messages.

* * * * *